Mar. 3, 1925.
R. W. HAMILTON
FARE REGISTER MECHANISM
Filed April 7, 1924
1,528,326
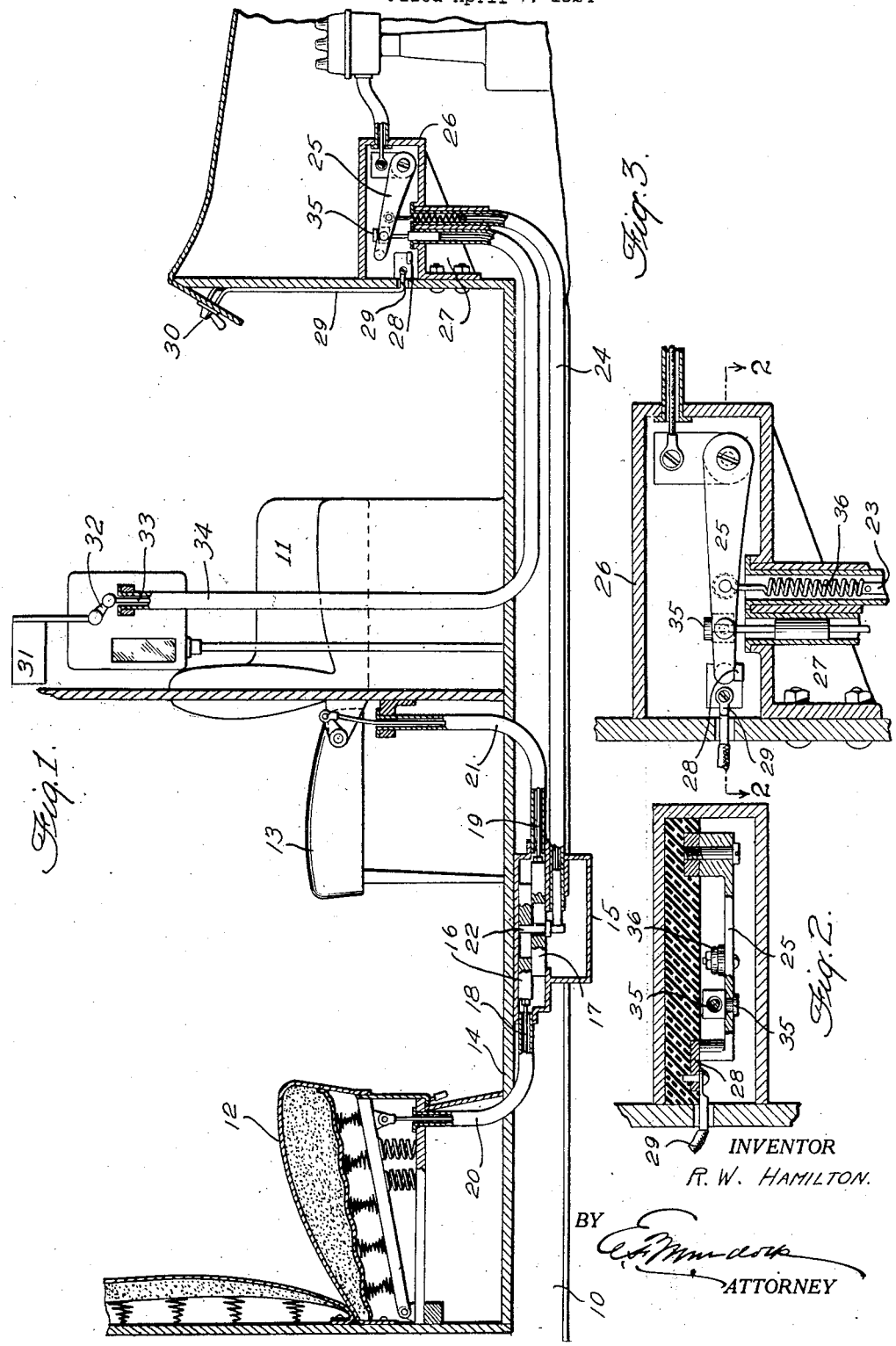
INVENTOR
R. W. HAMILTON.
BY
ATTORNEY Patented Mar. 3, 1925.

1,528,326

UNITED STATES PATENT OFFICE.

ROBERT W. HAMILTON, OF NEW YORK, N. Y.

FARE-REGISTER MECHANISM.

Application filed April 7, 1924. Serial No. 704,757.

*To all whom it may concern:*

Be it known that I, ROBERT W. HAMILTON, a citizen of the United States, and a resident of New York, in the county of New York and State of New York, have invented certain new and useful Improvements in Fare-Register Mechanism, of which the following is a full, clear, and exact description.

Among the principal objects which the present invention has in view are: to provide in a fare register mechanism means for rendering an ignition circuit of an automobile inoperative until the register mechanism is placed into operation by the driver; to provide in a fare register mechanism means for preventing operation of an automobile with the register nonoperative; to adapt the registering mechanism to traffic conditions under which the vehicle operates; to prevent tampering with the mechanism; and to simplify and cheapen the construction of such mechanism.

Drawings.

Figure 1 is a vertical section of a portion of a public vehicle showing the arrangement and construction of a mechanism when applied thereto;

Figure 2 is a horizontal section through the switch casing hereinafter described, and illustrated at the right of Figure 1; and Figure 3 is a vertical section through said casing.

Description.

The present mechanism, as illustrated in the accompanying drawings, is particularly designed for use in connection with public carriers such as automobiles of the taxicab type. As stated, an essential object of the invention is that the vehicle is rendered inoperative when a passenger enters same, until the fare register mechanism is set into operation. The vehicle 10, as illustrated, is of the usual type having the driver's seat 11 and passenger seats 12 and 13 therein. Beneath the floor 14 of the vehicle is disposed a casing 15 having slotted guide blocks 16 and 17 longitudinally movable therein and actuated through the limit of flexible cables 18 and 19, disposed through conduits 20 and 21 in connection with the bottom of the seats 12 and 13 respectively. These passenger seats are hinged, and upon depression under the weight of a passenger seated thereon, the respective cables 18 and 19 will be actuated to move the blocks 16 and 17 within the casing.

Extending through the slots in the respective guide blocks 16 and 17 is a pin 22 connected to a cable 23 disposed in the conduit 24 extending forwardly of the vehicle and connected with a switch arm 25 pivoted within a casing 26 supported on the bracket 27 on the instrument board of the vehicle forwardly of the driver's seat. In the normal inoperative position the parts are as illustrated in Figure 1 with the plate 25 or switch in raised position. In this position, the switch arm 25 is not engaged with the contact 28 located in the ignition circuit of the vehicle and communicating by means of the wire 29 with the usual ignition switch 30 is the instrument board of the vehicle. The switch arm 25 is disposed, as stated, in the ignition circuit and upon seating of a passenger upon either of the seats, as described, the pin 22 will be moved under the action of the guide blocks to raise the switch arm and contact 28, thereby opening the ignition circuit.

When it is desired to operate the vehicle, the driver thereof must lower the flag 31 of the fare mechanism, which movement, as in the usual construction, will render the mechanism operative. The flag 31 is in connection by means of a lever 32 with cable 33 extending through a conduit 34 into the casing 15 and terminating in a clip 35 extending laterally over and above the switch arm 25. On depression of the flag in the direction of the arrow, as indicated, the cable 33 will be drawn up within the conduit, drawing down the clip 35 and depressing the switch arm 25 against the action of the coil spring 36 at the end of the cable 23, to close the circuit at the contact 28, thus permitting the vehicle to be operated in the usual manner. As a passenger leaves the vehicle, the flag will be elevated to the vacant position and the clip 35 being released, the arm 25 of the switch will be raised into elevated position, breaking the circuit.

Claims.

1. In an automobile the combination with the ignition circuit thereof, of an auxiliary switch disposed therein, mechanical connection between said switch and seats of the automobile for opening said switch when a passenger is seated, a taxi-meter, and mechanical connection between said taxi-meter and switch for closing said switch by lowering of the flag of said meter.

2. The combination with the ignition circuit of an automobile equipped with a taximeter, of a supplemental switch in said circuit, a flexible cable connecting said switch and passenger seats of the automobile for opening said switch when a passenger is seated, and a flexible cable connecting the flag of said meter with said switch for closing said switch when the flag is lowered.

3. The combination with the ignition circuit of an automobile equipped with a taximeter, of a supplemental circuit closer in said circuit, an operating handle therefor, a flexible cable connecting said handle and a passenger seat for moving said handle to break the circuit when a passenger is seated, and a flexible cable connecting said handle and the flag of the taxi-meter to move said handle and close the circuit against action of the first named cable when said flag is lowered.

ROBERT W. HAMILTON.